US011988113B2

(12) United States Patent
VanDeMark

(10) Patent No.: US 11,988,113 B2
(45) Date of Patent: May 21, 2024

(54) DUCTED INLET FOR REDUCING FLOW OSCILLATIONS

(71) Applicant: The Boeing Company, Chicago, IL (US)

(72) Inventor: Zachariah B. VanDeMark, Snohomish, WA (US)

(73) Assignee: The Boeing Company, Chicago, IL (US)

(*) Notice: Subject to any disclaimer, the term of this patent is extended or adjusted under 35 U.S.C. 154(b) by 79 days.

(21) Appl. No.: 17/504,793

(22) Filed: Oct. 19, 2021

(65) Prior Publication Data

US 2022/0195878 A1 Jun. 23, 2022

Related U.S. Application Data

(60) Provisional application No. 63/127,612, filed on Dec. 18, 2020.

(51) Int. Cl.

*F01D 9/06* (2006.01)
*F01D 17/14* (2006.01)
*F01D 25/12* (2006.01)

(52) U.S. Cl.

CPC ............. *F01D 9/06* (2013.01); *F01D 17/145* (2013.01); *F01D 25/12* (2013.01); *F05D 2220/323* (2013.01); *F05D 2250/221* (2013.01); *F05D 2260/213* (2013.01); *F05D 2260/232* (2013.01); *F05D 2260/963* (2013.01)

(58) Field of Classification Search

None

See application file for complete search history.

(56) References Cited

U.S. PATENT DOCUMENTS

| | | | | |
|---|---|---|---|---|
| 7,322,195 B2 * | 1/2008 | Borja | B64D 33/02 60/725 |
| 8,033,111 B2 * | 10/2011 | Maeding | F23R 3/28 60/725 |
| 9,341,375 B2 * | 5/2016 | Kim | F23R 3/14 |
| 9,988,958 B2 * | 6/2018 | You | F01N 1/02 |
| 2017/0167291 A1 * | 6/2017 | Koroly | F01D 25/04 |
| 2019/0085770 A1 * | 3/2019 | Combes | F02C 7/20 |

FOREIGN PATENT DOCUMENTS

| | | | | |
|---|---|---|---|---|
| GB | 2381832 A * | 5/2003 | B64D 33/02 |
| WO | WO-2014055106 A1 * | 4/2014 | F02C 3/04 |

* cited by examiner

*Primary Examiner* — David P. Olynick
(74) *Attorney, Agent, or Firm* — Haynes and Boone, LLP

(57) ABSTRACT

A system may include a first duct including an air inlet end and an air outlet end, and a valve within the first duct and configured to open to allow or close to prevent fan duct air from the air inlet end to pass through to the air outlet end of the first duct. The system may also include a second duct including a first end and a second end. The first end of the second duct may be coupled to a sidewall of the first duct and configured to allow the fan duct air to flow from the first duct to the second duct. The system may also include a resonance chamber coupled to the second end of the second duct and configured to allow the air in the resonance chamber to act as a spring causing the air in the second duct to oscillate at a predefined frequency.

18 Claims, 5 Drawing Sheets

DUCTED INLET FOR REDUCING FLOW OSCILLATIONS

CROSS REFERENCE TO RELATED APPLICATION

The present application claims priority to U.S. Provisional Patent Application 63/127,612, which is hereby incorporated by reference in its entirety.

TECHNICAL FIELD

The present application generally relates to ducted inlets, and more particularly to a ducted inlet for reducing flow oscillations.

BACKGROUND

Some aircrafts employ air bleed off the engine's core air as part of its environmental control system (ECS). However, the air coming directly from the core is often too hot to be used directly by the ECS. In order to cool it, some engines employ a pre-cooler that is supplied with cooling air. As the cooling air is modulated based on demand, flow oscillations can result in the inlet duct, which can cause stresses on the duct and surrounding structure. Thus, techniques to reduce these effects are desirable.

SUMMARY

According to an example, a system may include: a first duct including an air inlet end and an air outlet end; a valve within the first duct and configured to open to allow or close to prevent fan duct air from the air inlet end to pass through to the air outlet end of the first duct; a second duct including a first end and a second end, wherein the first end is coupled to a sidewall of the first duct and configured to allow the fan duct air to flow from the first duct to the second duct; and a resonance chamber comprising a volume of air and coupled to the second end of the second duct, wherein the volume of air in the resonance chamber causes the fan duct air in the second duct to oscillate in the second duct at a predefined frequency.

According to another example, a gas turbine engine may include: a first duct including an air inlet end and an air outlet end; a valve within the first duct and configured to open to allow or close to prevent fan duct air from the air inlet end to pass through to the air outlet end of the first duct; a second duct including a first end and a second end, wherein the first end is coupled to a sidewall of the first duct and configured to allow the fan duct air to flow from the first duct to the second duct; a resonance chamber coupled to the second end of the second duct and configured to allow the fan duct air to flow from the second duct to the resonance chamber; and a fan duct coupled to the air inlet end of the first duct and configured to pass the fan duct air from the fan duct to the first duct.

According to another example, an aircraft may include a gas turbine engine, wherein the cooled bleed air is coupled an environmental control system of the aircraft.

According to another example, a method for reducing air oscillation in a first duct of a gas turbine engine may include: flowing fan duct air from a fan duct of the gas turbine engine to an air inlet end of the first duct; allowing the fan duct air to flow through the first duct and through an air outlet end of the first duct; and preventing the fan duct air from flowing through the air outlet end of the first duct such that the fan duct air flowing in to the first duct is forced back out through the air inlet end of the first duct and further forced in to a second duct coupled to a resonance chamber.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
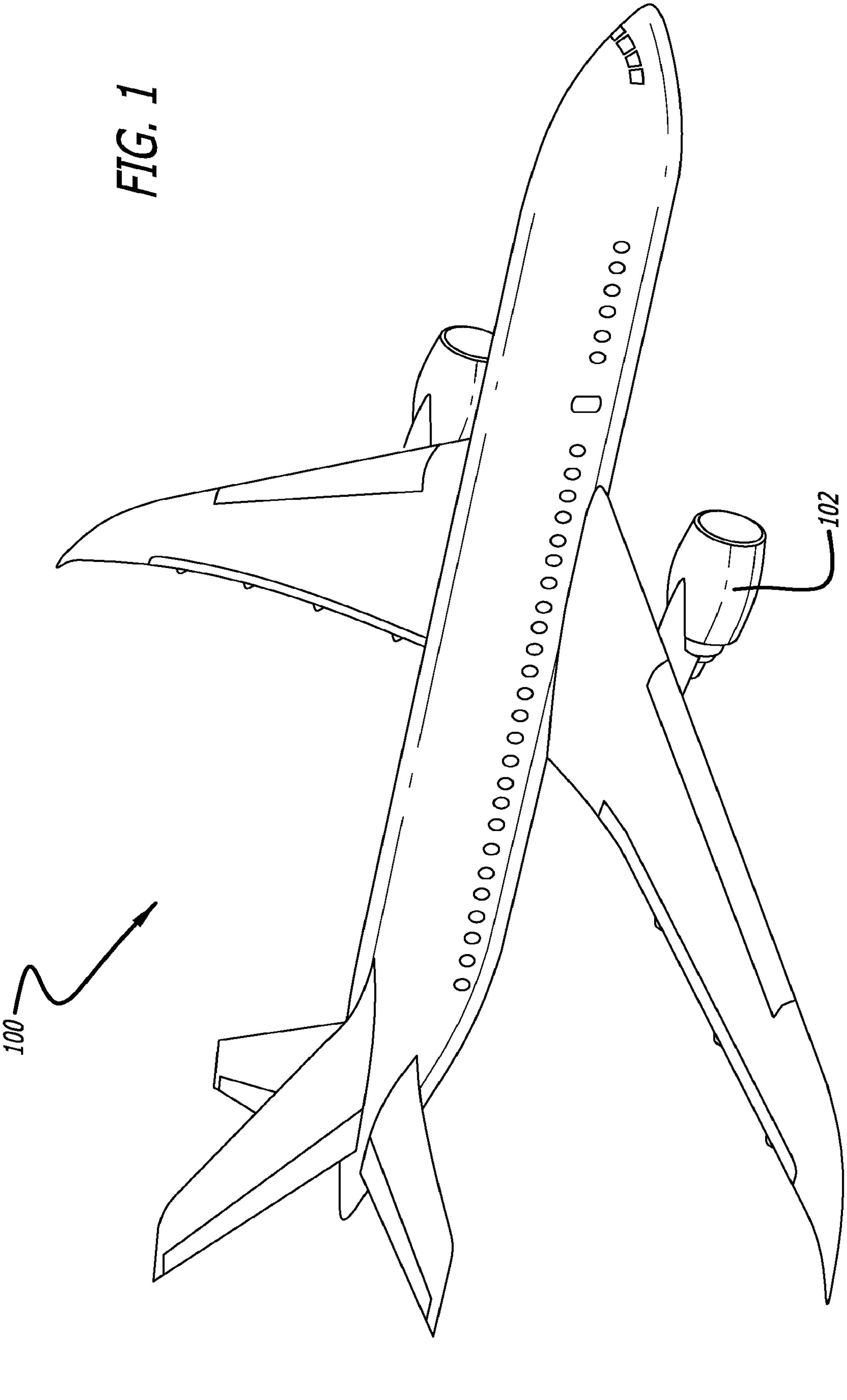
FIG. 1 is a perspective view of an example jet aircraft.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, various examples will be described in more detail with reference to the accompanying drawings. The present invention, however, may be embodied in various different forms, and should not be construed as being limited to only the illustrated examples herein. Rather, they are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

FIG. 1 is a perspective view of an example jet aircraft. The example aircraft 100 includes a gas turbine engine 102 under each of its wings. Other aircrafts may include two engines under each wing for a total of four engines. In these types of aircrafts, bleed air may be tapped off the engine core and used by the environmental control system (ECS) of the aircraft 100. ECS may include, for example, the aircraft's air conditioning system, cabin pressurization system, avionics cooling system, and fire suppression system, among other systems that are not listed here. However, the air coming directly from the engine core is often too hot to be used directly by the ECS. In order to cool the hot air, some engines employ an air-to-air heat exchanger (sometimes referred to as a "pre-cooler" or "pre-cooler heat exchanger") where relatively cooler air is used to remove the heat from the hot air and thereby lower the temperature of the hot air to a temperature that is more usable by the ECS. This cooler air may be provided through an intake scoop where the air is scooped in by the forward movement of the aircraft or from the fan flow of the engine.

Figure 2:
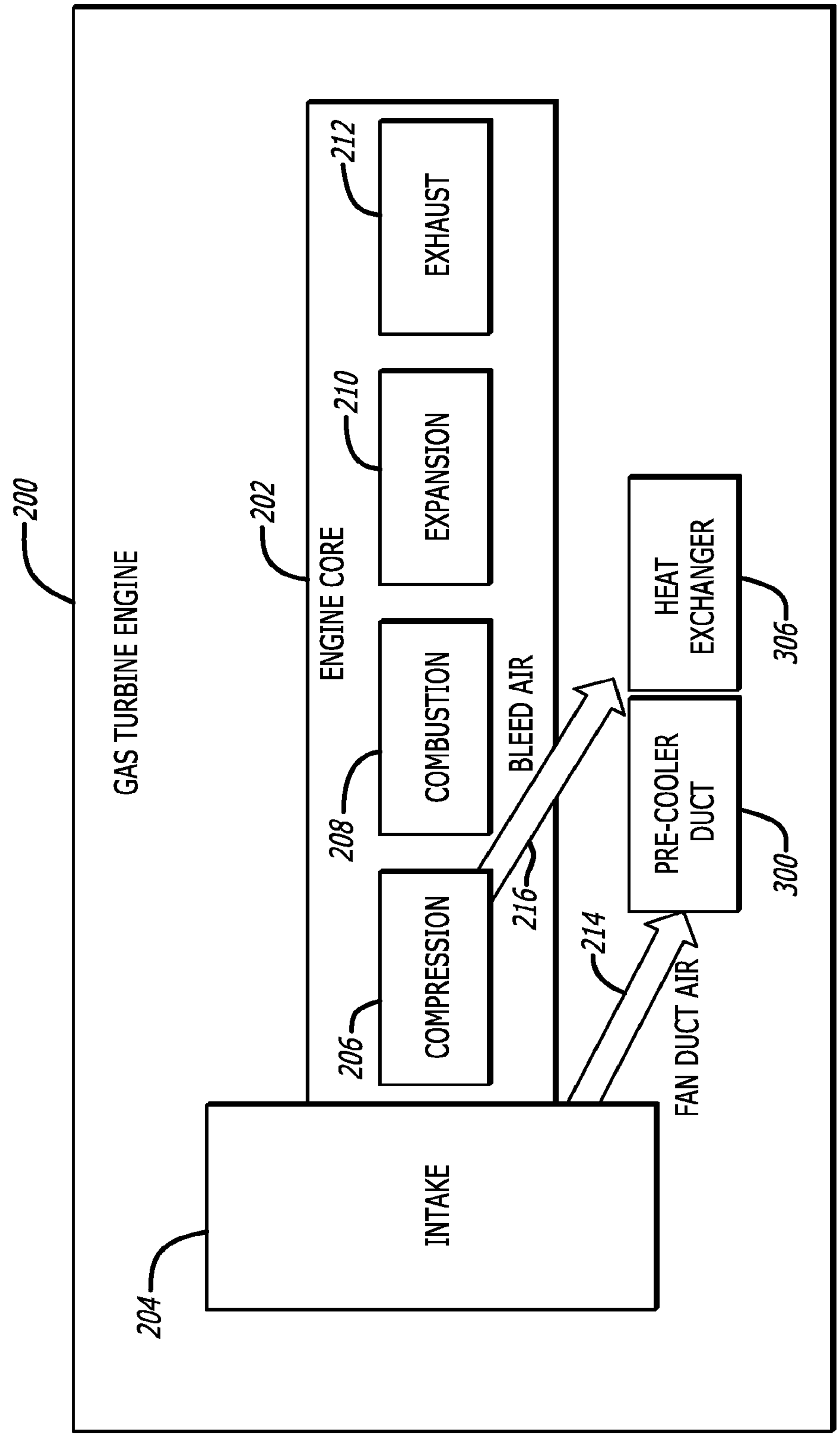
FIG. 2 is a system block diagram of a gas turbine engine according to various examples of the present disclosure.

FIG. 2 is a block diagram of a gas turbine engine according to various examples of the present disclosure. As illustrated, a gas turbine engine 200 includes at least an engine core 202 and an intake 204, and the engine core 202 includes four stages: compression 206, combustion 208, expansion 210, and exhaust 212. According to one example gas turbine engine 200, the intake 204 includes a fan that sucks in external air, which goes into the engine core 202 of the gas turbine engine 200. There, the air is mixed with fuel, and when compressed at the compression stage 206, the fuel-air mixture combusts at the combustion stage 208. Further details of the workings of an engine core 202 are known by those having ordinary skill in the art of gas turbine engines, and therefore will not be described in further details herein.

In some gas turbine engines 200, a pre-cooler duct 300 coupled with a heat exchanger 308 may be included as part of the gas turbine engine (e.g., outside of the engine core 202 but within the nacelle of the engine) to cool the hot air for use by the ECS. More particularly, the hot air may be provided from the bleed air 216 that is tapped off the engine core 202 after the compression stage 206 but before the combustion stage 208, and the cooling air may be the fan duct air 214 that is taken from the fan duct at the intake 204. As illustrated in FIG. 2, the fan duct air 214 is taken from the intake 204 and coupled to the pre-cooler duct 300, which couples the fan duct air 214 to the heat exchanger 306. The hot bleed air 216 is provided from the engine core 202 to the heat exchanger 306. In some engines, the bleed air 216 may be in the range of about 600 degrees Fahrenheit and the fan duct air 214 may be in the range of about 200 degrees Fahrenheit. Thus, the relatively hotter air is substantially cooled by the relatively cooler air to a temperature that is more usable by the ECS.

During flight operations, the demand on the bleed air 216 by the ECS varies across the flight envelope. For example, when there is less demand from the aircraft's air conditioning system, less bleed air 216 may be required, whereas when there is a greater demand from the aircraft's air conditioning system, more bleed air 216 may be required. Consequently, as the demand for the bleed air 216 changes, the demand on the fan duct air 214 follows because the bleed air 216 needs to be cooled before it can be used by the ECS. Moreover, taking more bleed air 216 than needed negatively affects the performance of the engines. Therefore, when the demand decreases, it is desirable to draw less bleed air 216 for better performance by the engines.

One method of controlling the demand on the fan duct air 214 is by a valve in the pre-cooler duct 300 to reduce the amount of fan duct air 214 that reaches the pre-cooler heat exchanger 308. However, as the valve is closed, air flow within the pre-cooler duct 300 is reduced, thus resulting in air oscillations within the duct. This in turn, causes noises and vibrations to the surrounding structure. Such excessive noises and vibrations may cause fatigue stress and therefore may result in structural damage to the various surrounding structures including the pre-cooler duct 300, the heat exchanger 308, and/or the engine nacelle. Accordingly, various examples of the present disclosure provide techniques to reduce such air oscillations that may result from controlling the air flow through the pre-cooler duct 300, and more generally, techniques for reducing air oscillations in a valved inlet ducts.

Figure 3:
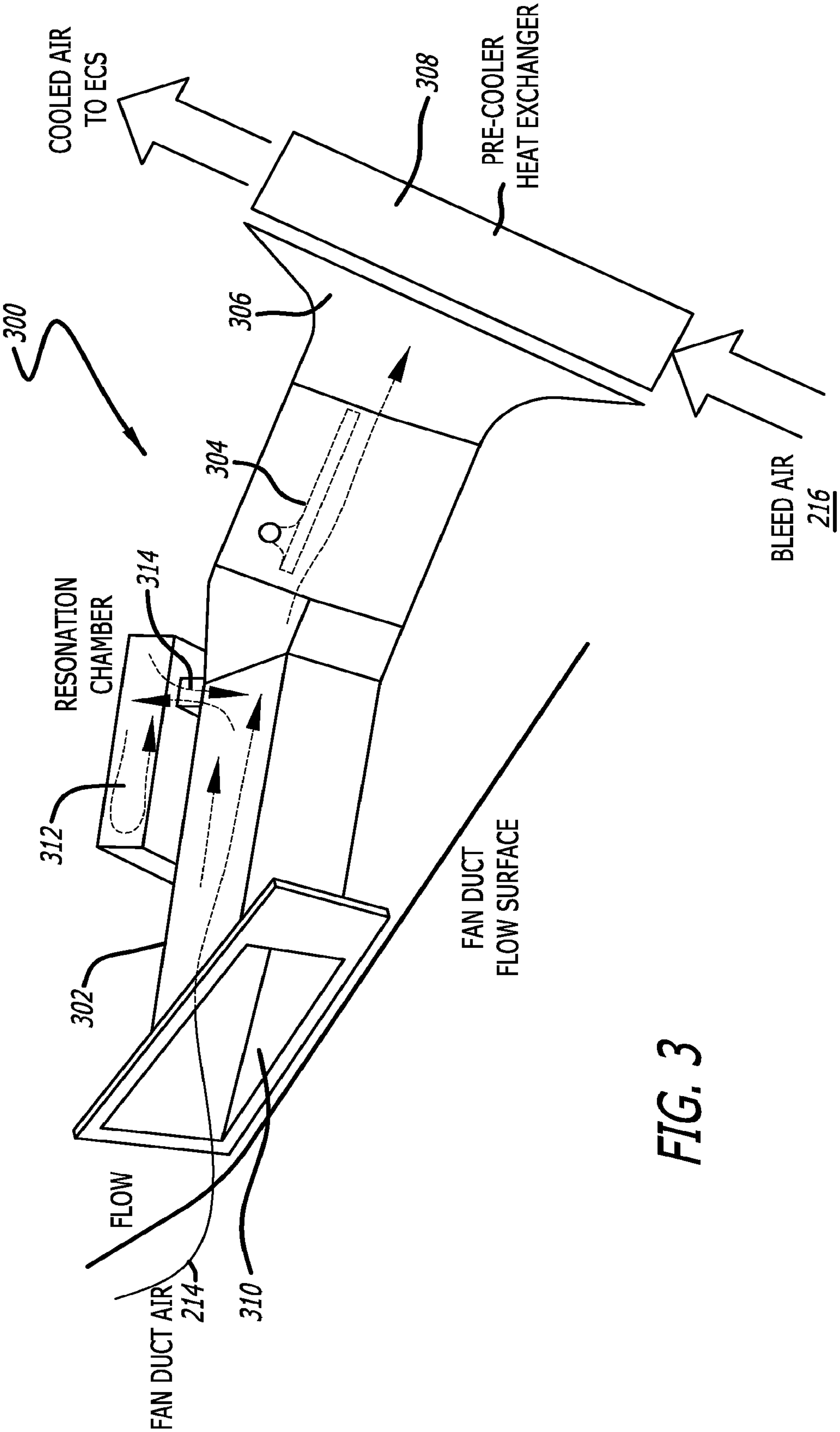
FIGS. 3-4 illustrate an example of an intake duct coupling fan duct air to a heat exchanger, according to various examples of the present disclosure.
Figure 4:
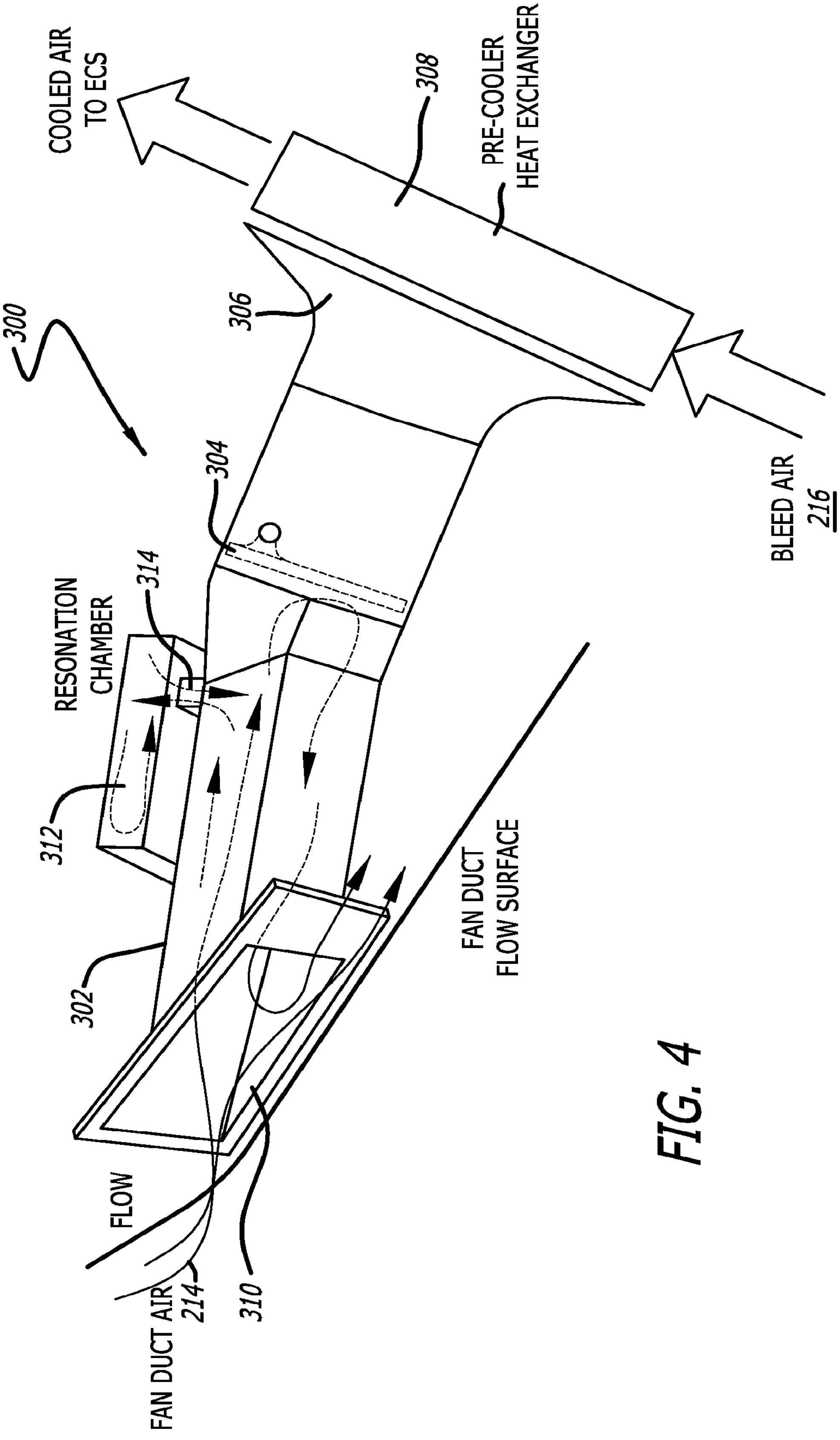

FIGS. 3-4 illustrate an example of the pre-cooler duct 300 that couples the duct fan air 214 to the pre-cooler heat exchanger, according to various examples of the present disclosure. In one example, pre-cooler duct 300 includes a first duct 302, an air inlet end 310, and an air outlet end 306. The air inlet end 310 may be coupled to the fan duct of the engine 200 and the air outlet end 306 may be coupled to the pre-cooler heat exchanger 308. The pre-cooler heat exchanger 308 is configured to receive the relatively hot (e.g., 600 degrees Fahrenheit) bleed air 216 from the engine core 202 and reduce the temperature of the bleed air 216 to a temperature that is more usable by the ECS (e.g., 200 degrees Fahrenheit). In one example, the pre-cooler heat exchanger 308 may be an air-to-air heat exchanger where the cooler fan duct air 214 is used to remove the heat from the hotter bleed air 216. Accordingly, the fan duct air 214 is provided to the air inlet end 310 such that the air flows through the first duct 302 and exits out of the air outlet end 306 and into the pre-cooler heat exchanger 308. The pre-cooler duct 300 also includes a valve 304 disposed within the first duct 302 and is configured to modulate the flow of the fan duct air through the first duct 302. The valve 304 may be opened to allow the fan duct air 214 to flow through the first duct 302 or closed to prevent the fan duct air 214 from flowing through the first duct 302. The example pre-cooler duct 300 illustrated in FIG. 3 is shown with the valve 304 in a fully opened position to allow maximum fan duct air 214 to flow through the first duct 302 and in to the pre-cooler heat exchanger 308. Accordingly, when the valve is fully opened 304, the fan duct air 214 flows through the first duct 302 with little to no disturbances to the air flow and the fan duct air 214 reaches the pre-cooler heat exchanger 308.

When the demand by the ECS is reduced, the demand on the bleed air 216 is also reduced, which in turn, reduces the demand on the fan duct air 214. According to one example, the valve 304 may be partially or fully closed as illustrated in FIG. 4. Thus, when the valve 304 is closed, the fan duct air 214 that normally flows undisturbed through the first duct 302 with the valve 304 opened, is reduced or cut off thus causing air oscillations within the first duct 302, as shown by the arrows. Accordingly, the fan duct air 214 enters the first duct 302 via the air inlet end 310 and the air flow is disturbed by the valve 304, and the air is forced back out through the air inlet end 310. Conventionally, if such air oscillations are allowed, the vibrations that result from the air oscillations may eventually damage the duct (or engine nacelle) or other surrounding areas of the aircraft. To overcome this problem, a resonation chamber 312 may be coupled to the first duct 302 of the pre-cooler duct 300 to reduce the air oscillations.

According to one example, the resonance chamber 312 may be coupled to the first duct 302 by a second duct 314 between the first duct 302 and the resonance chamber 312. The second duct 314 may be a much shorter and a smaller duct relative to the first duct 302 and may have a first end coupled to a sidewall of the first duct 302, and a second end coupled to the resonance chamber 312. The first end of the second duct 314 may be coupled to the sidewall of the first duct 302 between the air inlet end 310 and the valve 304. As such, the second duct 314 behaves like a neck portion of a Helmholtz resonator. In this manner, air may flow from the first duct 302 into and through the second duct 314, and oscillate in this second duct 314. The resonance chamber 312 contains a volume of air and this air acts as a spring that causes the air in the second duct 314 (e.g., the fan duct air that entered the second duct 314) to oscillate. In this manner, the second duct 314 and the resonance chamber 312 behave as a Helmholtz resonator. Consequently, the resonance chamber 312 may be designed or predefined to cancel or reduce the frequencies generated by the air oscillations in the first duct 302.

According to another example of the present disclosure, the resonance chamber 312 may be tuned to reduce or cancel certain frequencies or tones that result from the air oscillation that are undesired for the aircraft. The resonance chamber 312 may be tuned by designing the volume, and therefore configuring the dimensions of the resonance chamber 312 and the second duct 314 based on the dimensions of the first duct 302. For example, different widths, heights, and/or length of the first duct 302 between the air inlet end 310 and the valve 304 may generate oscillations of different frequencies. Based on these dimensions of the first duct 302, the dimensions of the resonance chamber 312 and/or the dimensions of the second duct 314 may be configured during the designing or manufacturing stages of the pre-cooler duct 300 so that the resonance chamber 312 will precisely cancel or reduce the air oscillations.

In certain examples, the resonation chamber 312 may be substantially cuboid shaped and the second duct 314 may be coupled to the sidewall at a right angle. Yet in other examples, the resonation chamber 312 may be cylindrical or spherical shaped. Accordingly, the volume of the resonance chamber 312 plays a significant role in determining the cancellation (or reduction) frequency of the air oscillation. The volume of the resonance chamber 312 and the dimensions (e.g., length and cross sectional area) of the second duct may be configured, for example, by computing:

$$f = \frac{c}{2\eta}\sqrt{\frac{S}{VL}},$$

where f is the frequency of the oscillation in the first duct 302 (calculated based on first duct 302 dimensions or measured during operation), c is the speed of sound in air, S is the cross-sectional area of the second duct 314, V is the volume of the resonance chamber 312, and L is the length of the second duct. After the pre-cooler duct 300 with the resonation chamber 312 is installed on the aircraft, the frequency of the resonation chamber 312 may be further adjusted or fine-tuned to more precisely cancel or reduce the air oscillations. Accordingly, the frequency of the oscillations in the first duct 302 is counteracted by the frequency of the oscillation in the second duct 314 caused by the resonation chamber 312, and thus, the first duct 302 oscillations may be canceled or reduced by the oscillations in the second duct 314 from the springing effect of the air in the resonance chamber 312.

In some instances, some air may flow in to the second duct 314 even when the valve 304 is fully open. However, because there are little to no disturbances in the air flow within the first duct 302, there are no air oscillations and therefore, only a negligible amount of air enters the second duct 314.

According to another example of the present disclosure, the resonance chamber 312 may be made of any dimensionally stable material (e.g., aluminum) such that the volume does not change under pressure or varying temperatures. For example, the resonance chamber 312 should be able to withstand air pressures of about 20 pounds per square inch and should also be able to withstand temperatures of the fan duct air 214 (e.g., about 200 degrees Fahrenheit) as well as lower temperatures (e.g., −40 degrees Fahrenheit) in which the aircraft may be exposed to while flying.

Figure 5:
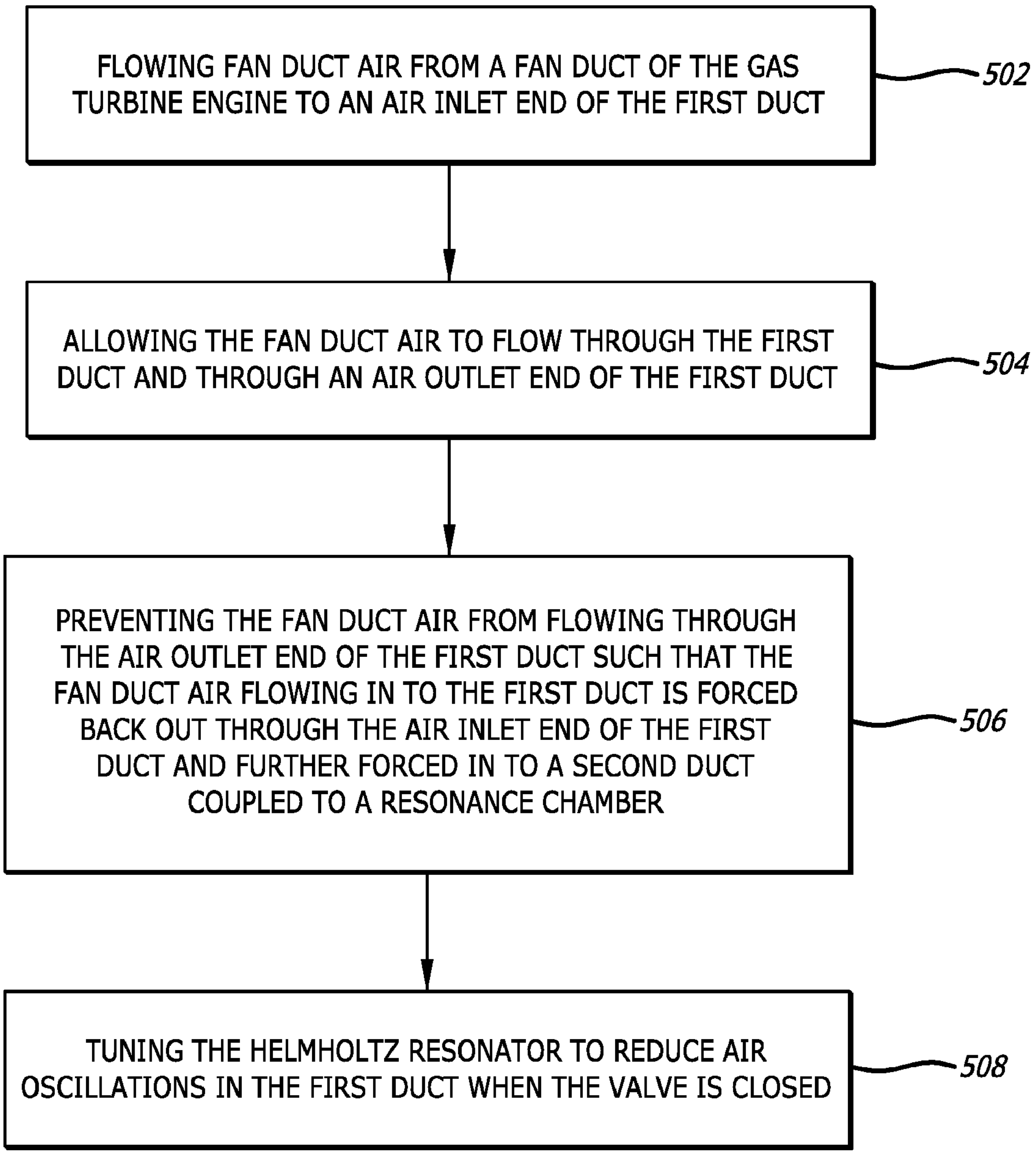
FIG. 5 is a flow chart of an example method for reducing air oscillations in the intake duct, according to various examples of the present disclosure.

FIG. 5 is a flow chart of an example method for reducing air oscillations in a duct, according to various examples of the present disclosure. In one example, the fan duct air flows from the fan duct of the gas turbine engine to an air inlet end of the first duct (502). When the demand on the bleed air is sufficiently high to warrant a high demand of the fan duct air by the heat exchanger, the valve in the first duct is opened and the fan duct air flows through the first duct and through an air outlet of the first duct (504). As the demand on the bleed air decreases during operations, the demand on the fan duct air is also reduced. In such case, the valve may be partially or fully closed, thus reducing or preventing the fan duct air from flowing through the air outlet end of the first duct such that the fan duct air flowing in to the first duct is forced back out through the air inlet end of the first duct. Additionally, fan duct air is further forced in to a second duct coupled to a resonance chamber (506). The resonance chamber may be a Helmholtz resonator and may be tuned to reduce the air oscillations in the first duct when the valve is closed (508). Thus, the physical effects to the duct and surrounding structures of the aircraft from the air oscillations is reduced or completely prevented by the resonance chamber.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being “on,” “connected to,” or “coupled to” another element or layer, it can be directly on, connected to, or coupled to the other element or layer, or one or more intervening elements or layers may be present. In addition, it will also be understood that when an element or layer is referred to as being “between” two elements or layers, it can be the only element or layer between the two elements or layers, or one or more intervening elements or layers may also be present.

As used herein, the terms “substantially,” “about,” and similar terms are used as terms of approximation and not as terms of degree, and are intended to account for the inherent deviations in measured or calculated values that would be recognized by those of ordinary skill in the art.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A system for use in a gas turbine engine including an engine core having a compression stage, the system comprising:

a first duct comprising an air inlet end and an air outlet end;

a valve within the first duct and configured to open to allow or close to prevent fan duct air from the air inlet end to pass through to the air outlet end of the first duct;

a second duct comprising a first end and a second end, wherein the first end is coupled to a sidewall of the first duct and configured to allow the fan duct air to flow from the first duct to the second duct;

a resonance chamber comprising a volume of air and coupled to the second end of the second duct, wherein the volume of air in the resonance chamber causes the fan duct air in the second duct to oscillate in the second duct at a predefined frequency; and a pre-cooler heat exchanger coupled at the air outlet end of the first duct such that when the valve is open, the fan duct air in the first duct provides cooling air to cool bleed air at the pre-cooler heat exchanger, the cooled bleed air being provided to an environmental control system (ECS) of an aircraft;

wherein the cooling air in the first duct and the bleed air are taken from air received by the gas turbine engine, the bleed air being compressed at the compression stage, the cooling air bypassing the compression stage;

wherein the valve closing causes the fan duct air to oscillate within the first duct while the volume of air in the resonance chamber oscillates to reduce the fan duct air oscillation in the first duct;

wherein the second duct and the resonance chamber are sized according to:

$$f=c/2\pi\sqrt{S/VL}$$

where f is a frequency associated with the first duct, c is the speed of sound, S is a cross-sectional area of the second duct, V is a volume of the resonance chamber, and L is a length of the second duct; and the first end of the second duct is coupled to the sidewall of the first duct between the valve and the air inlet end such that air oscillations generated in the first duct by the fan duct air are reduced by the resonance chamber when the valve is closed.

2. The system of claim 1, wherein a length of the second duct is shorter than a length of the first duct and the second duct is coupled to the first duct at a right angle, and wherein the resonance chamber comprises a generally cuboid shaped chamber.

3. The system of claim 1, wherein the resonance chamber and the second duct form a Helmholtz resonator tuned to reduce air oscillations in the first duct when the valve is closed, and wherein the Helmholtz resonator is tuned by configuring dimensions of the resonance chamber and dimensions of the second duct based on dimensions of the first duct.

4. The system of claim 1, wherein the gas turbine engine comprises an intake configured to receive external air that provides the bleed air and the cooling air.

5. The system of claim 1, wherein the engine core further comprises a combustion stage, an expansion stage, and an exhaust stage.

6. A gas turbine engine comprising:

the system of claim 1; and a fan duct coupled to the air inlet end of the first duct and configured to pass the fan duct air from the fan duct to the first duct.

7. The gas turbine engine of claim 6, further comprising a combustion stage, an expansion stage, and an exhaust stage.

8. The gas turbine engine of claim 7, wherein a temperature of the bleed air is greater than a temperature of the fan duct air from the fan duct.

9. An aircraft comprising the gas turbine engine of claim 7.

10. A method for reducing air oscillation in a first duct of a gas turbine engine including an engine core having a compression stage, the method comprising:

receiving external air by the gas turbine engine to provide an air flow through the gas turbine engine;

compressing some of the air from the air flow at the compression stage to obtain compressed air for mixing with fuel to obtain air/fuel mixture;

combusting the air/fuel mixture;

bleeding some of the compressed air after the compression stage but before combustion to obtain bleed air;

flowing the bleed air to a pre-cooler heat exchanger;

flowing some of the air flow as fan duct air from a fan duct of the gas turbine engine to an air inlet end of the first duct;

allowing the fan duct air to flow through the first duct and through an air outlet end of the first duct to provide cooling air for cooling the bleed air at the pre-cooler heat exchanger, the cooled bleed air being provided to an environmental control system (ECS) of an aircraft, wherein the cooling air bypasses the compression stage; and closing a valve disposed in the first duct to prevent the fan duct air from flowing through the air outlet end of the first duct such that the fan duct air flowing into the first duct is forced back out through the air inlet end of the first duct and further forced into a second duct coupled to a resonance chamber;

wherein closing the valve causes the fan duct air to oscillate within the first duct while the volume of air in the resonance chamber oscillates to reduce the fan duct air oscillation in the first duct wherein the second duct and the resonance chamber are sized according to:

$$f=c/2\pi\sqrt{S/VL}$$

where f is a frequency associated with the first duct, c is the speed of sound in air, S is a cross-sectional area of the second duct, V is a volume of the resonance chamber, and L is a length of the second duct; and a first end of the second duct is coupled to a sidewall of the first duct between the valve and the air inlet end such that air oscillations generated in the first duct by the fan duct air as a consequence of closing the valve are reduced by the resonance chamber.

11. The method of claim 10, further comprising:

obtaining the frequency f by measurement during operation; and constructing the resonant chamber and the second duct to have the values S, V, L corresponding to the measured frequency f.

12. The method of claim 10, wherein a length of the second duct is shorter than a length of the first duct and the second duct is coupled to the first duct at a right angle, and wherein the resonance chamber comprises a generally cuboid shaped chamber.

13. The method of claim 10, wherein the resonance chamber and the second duct form a Helmholtz resonator, the method further comprising tuning the Helmholtz resonator to reduce air oscillations in the first duct when the valve is closed.

14. The method of claim 13, wherein the tuning the Helmholtz resonator comprises configuring dimensions of the resonance chamber and dimensions of the second duct based on dimensions of the first duct.

15. The method of claim 10, wherein the gas turbine engine comprises an intake receiving external air that provides the bleed air and the cooling air.

16. The method of claim 10, wherein the engine core further comprises a combustion stage, an expansion stage, and an exhaust stage.

17. The method of claim 10, wherein a temperature of the bleed air is greater than a temperature of the fan duct air from the fan duct.

18. The method of claim 10, wherein the gas turbine engine is part of an aircraft.

* * * * *